United States Patent
Alsup

(10) Patent No.: US 7,552,290 B2
(45) Date of Patent: Jun. 23, 2009

(54) METHOD FOR MAINTAINING ATOMICITY OF INSTRUCTION SEQUENCE TO ACCESS A NUMBER OF CACHE LINES DURING PROACTIVE SYNCHRONIZATION WITHIN A COMPUTER SYSTEM

(75) Inventor: Mitchell Alsup, Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 244 days.

(21) Appl. No.: 11/508,491

(22) Filed: Aug. 23, 2006

(65) Prior Publication Data
US 2007/0050559 A1 Mar. 1, 2007

Related U.S. Application Data

(60) Provisional application No. 60/710,548, filed on Aug. 23, 2005.

(51) Int. Cl.
G06F 9/52 (2006.01)
G06F 12/12 (2006.01)

(52) U.S. Cl. ...................... 711/152; 711/155
(58) Field of Classification Search ............... 711/152, 711/155, 163, 147
See application file for complete search history.

(56) References Cited

U.S. PATENT DOCUMENTS

| | | | |
|---|---|---|---|
| 5,142,676 A | | 8/1992 | Fried |
| 6,389,519 B1 * | | 5/2002 | Thusoo et al. ............... 711/152 |
| 6,604,162 B1 * | | 8/2003 | Mosur et al. ................. 710/305 |
| 6,678,772 B2 | | 1/2004 | McKenney |
| 7,117,481 B1 * | | 10/2006 | Agesen et al. ............... 717/120 |
| 7,120,762 B2 * | | 10/2006 | Rajwar et al. ................ 711/150 |
| 7,269,717 B2 * | | 9/2007 | Tremblay et al. ........... 712/218 |
| 7,290,105 B1 * | | 10/2007 | Jeter et al. ................... 711/163 |
| 2004/0068607 A1 * | | 4/2004 | Narad ......................... 711/108 |
| 2004/0123058 A1 * | | 6/2004 | Hum et al. ................... 711/163 |

(Continued)

OTHER PUBLICATIONS

International Preliminary Report on Patentability; International Application No. PCT/US2006/033192; Authorized Officer Bota-Madsen, Zorka; Mailed on Aug. 11, 2007.

(Continued)

*Primary Examiner*—Shane M Thomas
*Assistant Examiner*—Hal Schnee
(74) *Attorney, Agent, or Firm*—Meyertons Hood Kivlin Kowert & Goetzel, P.C.; Stephen J. Curran

(57) ABSTRACT

A method for maintaining atomicity of a sequence of instructions includes a processor requesting exclusive access to a given memory resource. The request may include executing a critical section of code having memory reference instructions each including a LOCK prefix, and the memory reference instructions may be followed by an ACQUIRE instruction. The method also includes comparing each memory address of the critical section of code to each address of sets of addresses in response to execution of the ACQUIRE instruction. Each address of the sets of addresses corresponds to a respective memory resource to which a requester has exclusive access. In response to any memory address of the critical section of code matching any address of the sets of addresses, the method includes causing the ACQUIRE instruction to fail, and inhibiting modifying data corresponding to any memory address in an atomic phase of the critical section of code.

20 Claims, 4 Drawing Sheets

U.S. PATENT DOCUMENTS

| | | | |
|---|---|---|---|
| 2005/0132132 A1* | 6/2005 | Rosenbluth et al. | 711/108 |
| 2005/0283783 A1* | 12/2005 | DeSota | 718/100 |
| 2006/0026411 A1* | 2/2006 | Yoshida | 712/241 |
| 2006/0041788 A1* | 2/2006 | Brock et al. | 714/34 |
| 2006/0218556 A1* | 9/2006 | Nemirovsky et al. | 718/104 |

OTHER PUBLICATIONS

"Intel 80386 Programmer's Reference Manual 1986"; Intel Corporation; Feb. 1. 2001.

Finkel, R. A.; "An Operating Systems Vade Mecum"; Prentice Hall (New Jersey); 1988.

* cited by examiner

METHOD FOR MAINTAINING ATOMICITY OF INSTRUCTION SEQUENCE TO ACCESS A NUMBER OF CACHE LINES DURING PROACTIVE SYNCHRONIZATION WITHIN A COMPUTER SYSTEM

This application claims the benefit of U.S. Provisional Application No. 60/710,548, filed on Aug. 23, 2005.

BACKGROUND OF THE INVENTION

1. Field of the Invention

This invention relates to microprocessors and, more particularly, to process synchronization between processors in a multiprocessor system.

2. Description of the Related Art

Modern microprocessor performance has increased steadily and somewhat dramatically over the past 10 years or so. To a large degree, the performance gains may be attributed to increased operating frequency and moreover, to a technique known as deep pipelining. Generally speaking, deep pipelining refers to using instruction pipelines with many stages, with each stage doing less, thereby enabling the overall pipeline to execute at a faster rate. This technique has served the industry well. However, there are drawbacks to increased frequency and deep pipelining. For example, clock skew and power consumption can be significant during high frequency operation. As such, the physical constraints imposed by system level thermal budget points, and the increased difficulty in managing clock skew may indicate that practical limits of the technique may be just around the corner. Thus, industry has sought to increase performance using other techniques. One type of technique to increase performance is the use of multiple core processors and more generally multiprocessing.

As computing systems employ multiprocessing schemes with more and more processors (e.g., processing cores), the number of requesters that may interfere or contend for the same memory datum may increase to such an extent that conventional methods of process synchronization may be inadequate. For example, when a low number of processors are contending for a resource, simply locking structures may provide adequate performance to critical sections of code. For example, locked arithmetic operations on memory locations may be sufficient. As the scale of multiprocessing grows, these primitives become less and less efficient. To that end, more advanced processors include additions to the instruction set that include hardware synchronization primitives (e.g., CMPXCHG, CMPXCHG8B, and CMPXCHG16B) that are based on atomically updating a single memory location. However, we are now entering the realm in which even these hardware primitives may not provide the kind of performance that may be demanded in high-performance, high processor count multiprocessors.

Many conventional processors use synchronization techniques based on an optimistic model. That is, when operating in a multiprocessor environment, these conventional processors are designed to operate under the assumption that they can achieve synchronization by repeatedly rerunning the synchronization code until no interference is detected, and then declare that synchronization has been achieved. This type of synchronization may incur an undesirable waste of time, particularly when many processors are attempting the same synchronizing event, since no more than one processor can make forward progress at any instant in time. As such, different synchronization techniques may be desirable.

SUMMARY

Various embodiments of a method for maintaining atomicity of a sequence of instructions to access a number of cache lines during proactive synchronization in a computer system are disclosed. In one embodiment, the method includes a processor requesting exclusive access to a given memory resource. The request may include executing a critical section of code having one or more of memory reference instructions, each having a LOCK prefix, followed by an ACQUIRE instruction. The method also includes comparing each memory address specified in the critical section of code to each address of a plurality of sets of addresses in response to execution of the ACQUIRE instruction. Each address of the plurality of sets of addresses corresponds to a respective memory resource to which a requestor has been granted exclusive access. In addition, in response to any memory address of the critical section of code matching any address of a plurality of sets of addresses, the method includes causing the ACQUIRE instruction to fail, and inhibiting modifying data corresponding to any memory address in an atomic phase of the critical section of code.

In one specific implementation, the method may include generating a success indication that then enables entering the atomic phase, modifying data corresponding to all memory addresses in the atomic phase of the critical section of code, and releasing all memory addresses of the critical section of code for use by other processors upon completion of the modification in response to no memory address of the critical section of code matching any address in the plurality of sets of addresses.

In another specific implementation, the method may include causing the ACQUIRE instruction to fail, and inhibiting modifying data corresponding to any memory address in the atomic phase of the critical section of code in response to receiving a PROBE message that corresponds to any memory address specified in the specification phase of the critical section of code prior to receiving an indication of whether any memory address of the critical section of code matches any address of the plurality of sets of addresses.

In yet another specific implementation, the method may include responding to a received PROBE message corresponding to any memory address of the critical section of code with a failure message, in response to receiving an indication that no memory address of the critical section of code matches any address in the plurality of sets of addresses.

Figure 1:
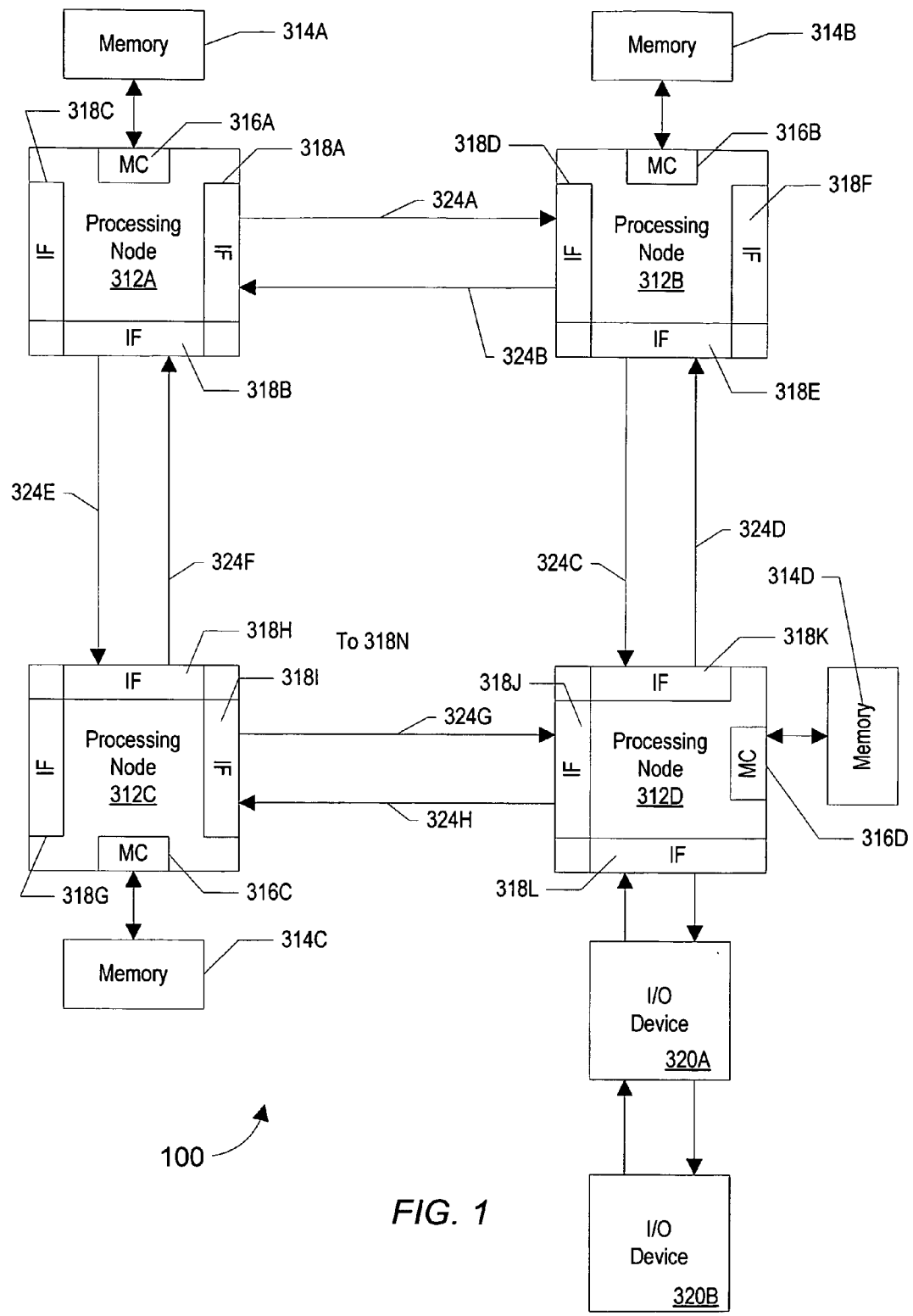
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (i.e., having the potential to, being able to), not a mandatory sense (i.e., must).

DETAILED DESCRIPTION

To enable the construction of high performance synchronization methods in software, a set of instructions, which may be referred to as an advanced synchronization facility may be used. The facility may support the construction of non-Blocking synchronization, WaitFree synchronization, Transactional Memory, along with the construction of various forms of Compare and Swap primitives typically used in the construction of these methods. The facility allows construction (in software) of a large variety of synchronization primitives.

Moreover, the advanced synchronization facility may enable software to program a large variety of synchronization kinds. Each synchronization kind may directly specify: the cache lines needed for successful completion, a sequence point where failures can redirect control flow, a data modification section where the result of the successful critical section is performed, and a sequence point where success is made visible to the rest of the system making the whole sequence of instructions appear to be atomic.

Accordingly, the functionality of the advanced synchronization facility may enable the acquisition and release of multiple cache lines with write permission associated with a critical section substantially simultaneously as seen by other processors/cores. This process may be referred to as Linearizing. After acquisition, several modifications can be performed before any other interested party may observe any of the modifications to any of the specified multiple cache lines. Between the acquisition and the release, no other processors are allowed to be manipulating these same lines (e.g. have write permission). A similar method could have been performed by not sending HyperTransport™ Source Done messages for the associated lines and thereby preventing concurrent accesses. However, these solutions lead to deadlock and/or livelock, or timeouts. Thus, a computer system including processors and processor cores that may implement the advanced synchronization facility is described below.

Turning now to FIG. 1, an embodiment of a computer system 100 is shown. Computer system 100 includes several processing nodes 312A, 312B, 312C, and 312D. Each of processing node 312A-312D is coupled to a respective memory 314A-314D via a memory controller 316A-316D included within each respective processing node 312A-312D. Additionally, processing nodes 312A-312D include interface logic (IF) used to communicate between the processing nodes 312A-312D. For example, processing node 312A includes interface logic 318A for communicating with processing node 312B, interface logic 318B for communicating with processing node 312C, and a third interface logic 318C for communicating with yet another processing node (not shown). Similarly, processing node 312B includes interface logic 318D, 318E, and 318F; processing node 312C includes interface logic 318G, 318H, and 318I; and processing node 312D includes interface logic 318J, 318K, and 318L. Processing node 312D is coupled to communicate with a plurality of input/output devices (e.g. devices 320A-320B in a daisy chain configuration) via interface logic 318L. Other processing nodes may communicate with other I/O devices in a similar fashion. Processors may use this interface to access the memories associated with other processors in the system. It is noted that a component that includes a reference numeral followed by a letter may be generally referred to solely by the numeral where appropriate. For example, when referring generally to the processing nodes, processing node(s) 312 may be used.

Processing nodes 312 implement a packet-based link for inter-processing node communication. In the illustrated embodiment, the link is implemented as sets of unidirectional lines (e.g. lines 324A are used to transmit packets from processing node 312A to processing node 312B and lines 324B are used to transmit packets from processing node 312B to processing node 312A). Other sets of lines 324C-324H are used to transmit packets between other processing nodes as illustrated in FIG. 1. Generally, each set of lines 324 may include one or more data lines, one or more clock lines corresponding to the data lines, and one or more control lines indicating the type of packet being conveyed. The link may be operated in a cache coherent fashion for communication between processing nodes or in a non-coherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown (e.g., 320A and 320B). It is noted that in an exemplary embodiment, the link may be implemented as a coherent HyperTransport™ link or a non-coherent HyperTransport™ link, although in other embodiments, other links are possible.

I/O devices 320A-320B may be any suitable I/O devices. For example, I/O devices 320A-320B may include devices for communicating with another computer system to which the devices may be coupled (e.g. network interface cards or modems). Furthermore, I/O devices 320A-320B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "I/O device" and the term "peripheral device" are intended to be synonymous herein.

Memories 314A-314D may comprise any suitable memory devices. For example, a memory 314A-314D may comprise one or more RAMBUS DRAMs (RDRAMs), synchronous DRAMs (SDRAMs), DDR SDRAM, static RAM, etc. The memory address space of computer system 300 is divided among memories 314A-314D. Each processing node 312A-312D may include a memory map used to determine which addresses are mapped to which memories 314A-314D, and hence to which processing node 312A-312D a memory request for a particular address should be routed. Memory controllers 316A-316D may comprise control circuitry for interfacing to memories 314A-314D. Additionally, memory controllers 316A-316D may include request queues for queuing memory requests. Memories 314A-314D may store code executable by the processors to implement the functionality as described in the preceding sections.

It is noted that a packet to be transmitted from one processing node to another may pass through one or more intermediate nodes. For example, a packet transmitted by processing node 312A to processing node 312D may pass through either processing node 312B or processing node 312C as shown in FIG. 1. Any suitable routing algorithm may be used. Other embodiments of computer system 100 may include more or fewer processing nodes then the embodiment shown in FIG. 1. Generally, the packets may be transmitted as one or more bit times on the lines 324 between nodes. A bit time may be the rising or falling edge of the clock signal on the corresponding clock lines. The packets may include command packets for initiating transactions, probe packets for maintaining cache coherency, and response packets from responding to probes and commands.

Figure 2:
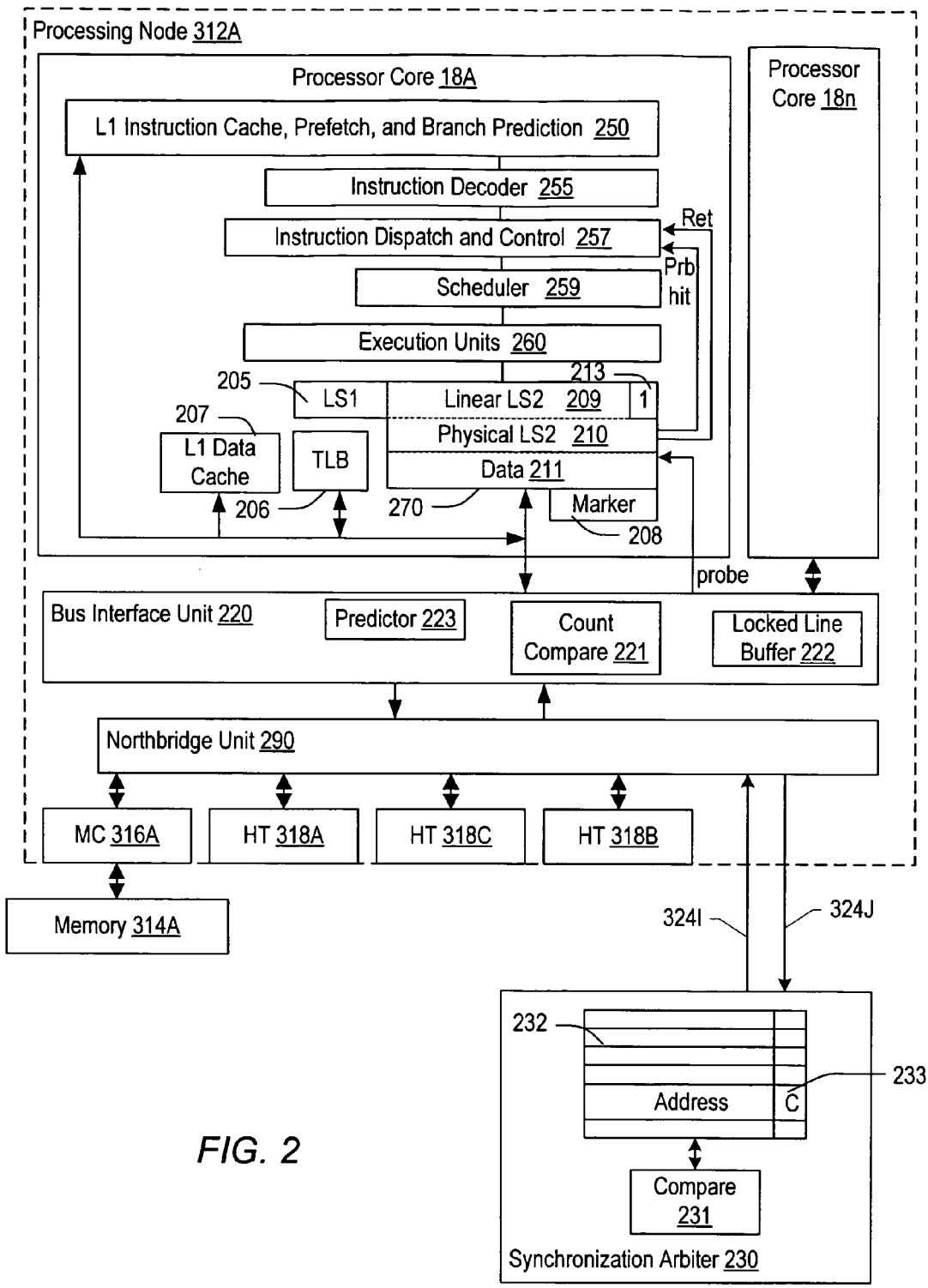
FIG. 2 is a block diagram depicting further details of an embodiment a processing node of FIG. 1.

In one embodiment, processing nodes 312 may additionally include one or more processor cores (shown in FIG. 2). It is noted the processor cores within each node may communicate via internal packet-based links operated in the cache coherent fashion. It is further noted that processor cores and processing nodes 312 may be configured to share any (or all) of the memories 314.

In one embodiment, one or more of the processor cores may implement the x86 architecture, although other architectures are possible and contemplated. As such, instruction decoder logic within each of the various processor cores may be configured to mark instructions that use a LOCK prefix. In addition, as described further below, processor core logic may include hardware (shown in FIG. 2) that may enable identification of the markers associated with LOCKed instructions. This hardware may enable the use of the LOCK instruction prefix to identify critical sections of code as part of the advanced synchronization facility.

To reduce the effects of interference caused by more than one processor attempting to access the same memory reference (e.g., critical sections of code) at the same time, the advanced synchronization facility and associated hardware may be implemented within computer system 100. As will be described in greater detail below, the advanced synchronization facility may employ new instructions and use hardware such as a synchronization arbiter (shown in FIG. 2) which may be interconnected within the cache coherent fabric. As shown in FIG. 2, synchronization arbiter 230 is coupled to a Northbridge unit 290 of any processing node 312, thus enabling the synchronization arbiter to observe explicit addresses associated with the Advanced Synchronization Facility transactions of each node. The synchronization arbiter may be placed anywhere in the coherent domain of the interconnect network. It is noted that although one synchronization arbiter is shown, it is contemplated that when a system is configured to support multiple virtual machines, and when these virtual machines do not share any actual physical memory, multiple synchronization arbiters can be configured to distribute the synchronization load across several arbiters.

It is noted that the phrase "critical section" is used throughout this document. A "critical section" refers to a section of code used in the advanced synchronization facility that may include one or more memory reference instructions marked with a LOCK prefix, an ACQUIRE instruction, and a RELEASE instruction which ends the critical section. In one embodiment, there are four stages of each critical section: 1) specifying the address(es) of the cache line(s) needed during the critical section (e.g., entering the critical section), 2) going through the mechanics to acquire these cache lines, 3) atomically modifying the critical section data, 4) releasing the cache lines back to the system. In particular, the critical section code will appear to be executed atomically by interested observers. The first phase may be referred to as the specification phase, while the third phase is often referred to as the atomic phase.

In various implementations, software may be allowed to perform 'simple' arithmetic and logical manipulations on the data between reading and modifying the data of the critical section as long as the simple arithmetic operations do not cause exceptions when executed. If a data manipulation causes an exception inside a critical section, atomicity of that critical section may not be guaranteed. Critical section software should detect failures of atomicity, and deal with them appropriately, s described further below.

Generally, the advanced synchronization facility may utilize a weakened memory model and operate only upon cacheable data. This weakened memory model may prevent the advanced synchronization facility from wasting processor cycles waiting for various processor and memory buffers to empty before performing a critical section. However, when software requires a standard PC strong memory model, software may insert LFENSE, SFENSE, or MFENSE instructions just prior to the RELEASE instruction to guarantee standard PC of memory ordering. For the case of using cacheable synchronization to enable accesses to unCacheable data, an SFENSE instruction between the last LOCKed Store and the RELEASE instruction will guarantee that the unCacheable data is globally visible before the cacheable synchronization data is globally visible in any other processor. This may enable maximum overlap of unCacheable and Cacheable accesses with minimal performance degradation.

In various embodiments, interface logic 318A-318L may comprise a variety of buffers for receiving packets from the link and for buffering packets to be transmitted upon the link. Computer system 100 may employ any suitable flow control mechanism for transmitting packets. In addition to interface logic 318A-318L each processing node may include respective buffer interface units (BIU) 220 (shown in FIG. 2), which may provide functionality to enable proactive synchronization. For example, as described further below, BIU 220 may be configured to those special addresses that are associated with an Advanced Synchronization event and to transmit those addresses to synchronization arbiter 230 in response to execution of an ACQUIRE instruction. The BIU 220 may also be configured to determine if the response received from synchronization arbiter 230 indicates the addresses may be interference free. Depending on whether the response indicates the addresses may not be interference free, BIU 220 may notify the requesting processor core of a failure by sending a failure count value to a register within the processor core 18, and sending a completion message to synchronization arbiter 230, or when guaranteed to be interference free by allowing the execution of the critical section, and waiting to send the completion message to synchronization arbiter 230.

FIG. 2 is a block diagram that illustrates more detailed aspects of embodiments of processing node 312A and synchronization arbiter 230 of FIG. 1. Referring to FIG. 2, processing node 312A includes processor cores 18A and 18n, where n may represent any number of processor cores. Since the processor cores may be substantially the same in various embodiments, only detailed aspects of processor core 18A are described below. As shown, processor cores 18A and 18n are coupled to bus interface unit 220 which is coupled to a Northbridge unit 290, which is coupled to memory controller 316A, HyperTransport™ interface logic 318A-318C, and to synchronization arbiter 230 via a pair of unidirectional links 324I-324J.

Processor core 18A includes hardware configured to execute instructions. More particularly, as is typical of many processors, processor core 18A includes one or more instruction execution pipelines including a number of pipeline stages, cache storage and control, and an address translation mechanism (only pertinent portions of which are shown for brevity). Accordingly, as shown processor core 18A includes a level one (L1) instruction cache, prefetch logic, and branch prediction logic. Since these blocks may be closely coupled with the instruction cache, they are shown together as block 250. Processor core 18A also includes an L1 data cache 207. Processor core 18A also includes instruction decoder 255 and an instruction dispatch and control unit 256 may be coupled to receive instructions from instruction decoder 255 and to dispatch operations to a scheduler 259. Further, instruction dispatch and control unit 256 may be coupled to a microcode read-only memory (MROM) (not shown). Scheduler 259 is coupled to receive dispatched operations from instruction dispatch and control unit 256 and to issue operations to execution units 260. In various implementations, execution units 260 may include any number of integer execution units and floating-point units. Further, processor core 18A includes a TLB 206 and a load/store unit 270. It is noted that in alternative embodiments, an on-chip L2 cache may be present (although not shown).

Instruction decoder 255 may be configured to decode instructions into operations which may be either directly decoded or indirectly decoded using operations stored within the MROM. Instruction decoder 255 may decode certain instructions into operations executable within execution units 260. Simple instructions may correspond to a single operation, while in other embodiments, more complex instructions may correspond to multiple operations. In one embodiment, instruction decoder 255 may include multiple decoders (not shown) for simultaneous decoding of instructions. Each instruction may be aligned and decoded into a set of control values in multiple stages depending on whether the instructions are first routed to MROM. These control values may be routed in an instruction stream to instruction dispatch and control unit 257 along with operand address information and displacement or immediate data which may be included with the instruction. As described further below, when a memory reference instruction includes a LOCK prefix, instruction decoder may identify the address with a marker.

Load/store unit 270 may be configured to provide an interface between execution units 260 and data cache 207. In one embodiment, load/store unit 270 may include load/store buffers with several storage locations for data and address information for pending loads or stores. As such, the illustrated embodiment includes LS1 205, linear LS2 209, physical LS2 210, and data storage 211. Further, processor core 18A includes marker logic 208, and a marker bit 213.

In one embodiment, a critical section may be processed in one of two ways: deterministically, and optimistically. The choice of execution may be based upon the configuration of the advanced synchronization facility and upon the state of a critical section predictor, as described in greater detail below. In various embodiments, either the basic input output system (BIOS), the operating system (OS), or a virtual memory manager (VMM) may configure the operational mode of the advanced synchronization facility. When operating in the deterministic execution mode, the addresses specified by the locked memory reference instructions may be bundled up and sent enmasse to the synchronization arbiter 230 to be examined for interference. The cache line data may be obtained and the critical section executed (as permitted). In contrast, when operating in the optimistic synchronization mode, no interference may be assumed, and the critical section may be executed (bypassing the synchronization arbiter 230) and if any other processor interferes with this critical section, the interference will be detected and then the processor backs up to the ACQUIRE instruction and redirects control flow away from the atomic phase.

To implement the deterministic mode, the advanced synchronization facility may use the synchronization arbiter 230. As described above, synchronization arbiter 230 examines all of the physical addresses associated with a synchronization request and either pass (a.k.a. bless) the set of addresses or fail (i.e., reject) the set of addresses, based upon whether any other processor core or requestor is operating on or has requested those addresses while they are being operated on. As such, synchronization arbiter 230 may allow software to be constructed that proactively avoids interference. When interference is detected by synchronization arbiter 230, synchronization arbiter 230 may respond to a request with a failure status including a unique number (e.g., count value 233) to a requesting processor core. In one embodiment, the count may be indicative of the number of requestors contending for the memory resource(s) being requested. Software may use this number to proactively avoid interference in subsequent trips through the critical section by using this number to choose a different resource upon which to attempt a critical section access.

Accordingly, as shown in FIG. 2, synchronization arbiter 230 includes a storage 232 including a number of entries. Each of the entries may store one or more physical addresses of requests currently being operated on. In one embodiment, each entry may store up to eight physical addresses that are transported as a single 64-byte request. In addition, the synchronization arbiter entry includes the count value 233, which corresponds to all the addresses in the entry. As described above, the count value may be indicative of the number of requestors (i.e., interferers) that are contending for any of the addresses in a critical section. When synchronization arbiter 230 receives a set of addresses, a compare unit 231 within synchronization arbiter 230 checks for a match between each address in the set and all the addresses in storage 232. If there is no match, synchronization arbiter 230 may be configured to issue a pass response by returning a passing count value and to store the addresses within storage 232. In one embodiment, the passing count value is zero, although suitable count value may be used. However, if there is an address match, synchronization arbiter 230 may increment the count value 233 associated with set of addresses that includes the matching address, and then return that count value as part of a failure response. It is noted that compare unit 231 may be a compare only structure implemented in a variety of ways, as desired. In addition, in another embodiment, each address stored within storage 232 may be associated with a respective count. As such, the count value may be indicative of the number of requesters (i.e., interferers) that are contending for one of the respective address in a critical section.

In the illustrated embodiment, bus interface unit (BIU) 220 includes a count compare circuit 221, a locked line buffer (LLB) 222, and a predictor 223. BIU 220 may also include various other circuits for transmitting and receiving transactions from the various components to which it is connected, however, these have been omitted for clarity. As such, BIU 220 may be configured to transmit a set of addresses associated with a critical section from LLB 222 to synchronization arbiter 230 in response to the execution of an ACQUIRE instruction. In addition, compare circuit 221 may be configured to compare the count value returned by synchronization arbiter 230 to check if the count is a passing count value (e.g., zero) or a failing count value. It is noted that LLB 222 may be implemented using any type of storage structure. For example, it may be part of an existing memory address buffer (MAB) or separate, as desired.

As described above, if processor core 18 is operating in the deterministic synchronization mode, addresses associated with a critical section may be marked during instruction decode by using the LOCK prefix. More particularly, memory references that explicitly participate in advanced synchronization code sequences are annotated by using the LOCK prefix with an appropriate MOV instruction. LOCKed Load instructions may have the following form:

LOCK MOVx reg,[B+I*s+DISP].

More particularly, a regular x86 memory read instruction is made special by attaching a LOCK prefix. This causes the BIU 220 to gather the associated marked physical address into the LLB 222 as the address passes through the L1 cache (and TLB 206). In addition, memory access strength is reduced to access the line (in the case of a cache miss) without write permission (ReadS, not ReadM or Read). The Load instruction may not be retired out of LS2 until the ACQUIRE instruction returns from the synchronization arbiter 230.

While the request form BIU 220 (to synchronization arbiter 230) is awaiting a response, the LLB 222 watches for Probes with INValidate semantics, and if one (or more) occurs, the ACQUIRE instruction will be made to fail, even if synchronization arbiter 230 returns a success. The LOCK prefix does not cause any particular locking of the cache or bus, but simply provides a convenient marker to be added to memory based MOVe instructions. As such, LOCKed MOV to register instructions (which may be otherwise referred to as LOCKed Loads) may be processed normally down the data cache pipeline.

Accordingly, during address translation each linear address may be stored within linear address portion of LS2 209. The corresponding physical addresses may be stored in TLB 206 and within physical LS2 210, while the corresponding data may be stored within data cache 207 and data LS2 211. Marker logic 208 may detect the LOCK prefix marker generated during decode and generate an additional marker bit 213, thereby marking each such address as a participant in a critical section. Any LOCKed Load that takes a miss in the data cache may have its cache line data fetched through the memory hierarchy with Read-to-Share access semantics, however write permission to that specified memory resource is checked.

As described above, if processor core 18 is operating in a deterministic synchronization mode, addresses associated with a critical section may be marked during instruction decode by using the LOCK prefix. More particularly, memory prefetch references that explicitly participate in advanced synchronization code sequences are annotated by using the LOCK prefix with an appropriate PREFETCHW instruction. These types of LOCKed Load instructions may have the following form:

LOCK PREFETCHW [B+I*s+DISP].

Thus, a regular memory PREFETCHW instruction is made special by attaching a LOCK prefix. This causes the BIU 220 to gather the associated marked physical address into the LLB 222 as the address passes through the L1 cache (and TLB 206). In addition, memory access strength is reduced to avoid an actual DRAM access the line. The PREFETCHW instruction may not be retired out of LS2 until the ACQUIRE instruction returns from synchronization arbiter 230. These instructions may be used to touch cache lines that participate in the critical section and that need data (e.g., a pointer) in order to touch other data also needed in the critical section. At the conclusion of the specification phase, an ACQUIRE instruction is used to notify BIU 220 that all memory reference addresses for the critical section are stored in LLB 222.

The ACQUIRE instruction may have the form
ACQUIRE reg, imm8

The ACQUIRE instruction checks that the number of LOCKed memory reference instructions is equal to the immediate value in the ACQUIRE instruction. If this check fails, the ACQUIRE instruction terminates with a failure code, otherwise, the ACQUIRE instruction causes BIU 220 to send all addresses stored within LLB 222 to the synchronization arbiter 230. This instruction 'looks' like a memory reference instruction on the data path so that the count value returned from the synchronization arbiter 230 can be used to confirm (or deny) that all the lines can be accessed without interference. No address is necessary for this 'load' instruction because there can be only one synchronization arbiter 230 per virtual machine or per system. The register specified in the ACQUIRE instruction is the destination register of processor core 18.

In one embodiment, the semantics of a LOCKed Load operation may include probe monitoring the location for a PROBE. If a PROBE is detected for a location, the LS1 or LS2 queue may return a failure status without waiting for the read to complete. A general-purpose fault (#GP) may be generated if the number of LOCKed loads exceeds a micro-architectural limit. If an ACQUIRE instruction fails, the count of LOCKed loads will be reset to zero. If the address is not to a Write Back memory type, the ACQUIRE instruction can be made to fail (when subsequently encountered).

It is expected that some critical sections may include a number of arithmetic and control flow decisions to compute what data modifications may be appropriate (if any). However, software should arrange that these types of instructions never cause an actual exception. In one embodiment, arithmetic and memory reference instructions may be processed in either the SSE registers (XMM), or in the general-purpose registers (e.g., EAX, etc), or in the MMX or x87 registers.

As described above, synchronization arbiter 230 may either pass the request enmasse or fail the request enmasse. If synchronization arbiter 230 fails the request, the response back to BIU 220 may be referred to as a "synchronization arbiter Fail-to-ACQUIRE" with the zero bit set (e.g., RFLAGS.ZF). As described above, the response returned by synchronization arbiter 230 may include the count value 233, which may be indicative of the number of interferers. Software may use this count to reduce future interference as described above. The count value 233 from the synchronization arbiter 230 may be delivered to a general-purpose register (not shown) within processor core 18 and may also be used to set condition codes. If the synchronization arbiter 230 passes the request, the response back to BIU 220 may include a pass count value (e.g., zero).

In one embodiment, if the synchronization arbiter address storage 232 is full, the request may be returned with a negative count value such as minus one (−1), for example. This may provide software running on the processor core a means to see an overload in the system and to enable that software to stop making requests to synchronization arbiter 230 for a while. For example, the software may schedule something else or it may simply waste some time before retrying the synchronization attempt.

If the count is zero (meaning there are no interferers observed by synchronization arbiter 230), processor core 18 may execute the instructions in the atomic phase and manipulate the data in the cache lines as desired. When the data manipulation is complete, a RELEASE instruction is executed signifying the end of the critical section. In one embodiment, the RELEASE instruction enables all of the modified data to become visible substantially simultaneously by sending the RELEASE message to synchronization arbiter 230, thereby releasing the associated cache lines back to the system.

In one embodiment, the advanced synchronization facility supports two kinds of failures, a "Fail-to-ACQUIRE" and a "Fail-to-REQUESTOR". The Fail-to-ACQUIRE failure causes the ACQUIRE instruction to complete with the zero bit set (e.g., RFLAGS.ZF) so that the subsequent conditional jump instruction can redirect control flow away from damage inducing instructions in the atomic phase. The synchronization arbiter Fail-to-ACQUIRE with the zero bit set (e.g., RFLAGS.ZF) is one type of Fail-to-ACQUIRE failure. A processor Fail-to-ACQUIRE is another type. In one embodiment, during execution of critical sections, processor cores may communicate by observing memory transactions. These observations may be made visible at the ACQUIRE instruction of an executing processor core. More particularly, during the time between the start of collecting of the addresses necessary for a critical section and the response of synchronization arbiter 230, processor core 18 monitors all of those addresses for coherent invalidation probes (e.g., Probe with INvalidate). If any of the lines are invalidated, the response from synchronization arbiter 230 may be ignored and the ACQUIRE instruction may be made to fail with the zero bit set (e.g., RFLAGS.ZF).

The Fail-to-REQUESTOR failure may be sent as a PROBE response if there is a cache hit on a line that has been checked for interference and passed by synchronization arbiter 230. A Fail-to-REQUESTOR response causes the requesting processor to Fail-to-ACQUIRE if it is currently processing an advanced synchronization facility critical section, or it will cause the requesting processor's BIU to re-request that memory request if it is not processing the critical section. As such, BIU 220 may be configured to cause a Fail-to-ACQUIRE in response to receiving a Probe with INValidate prior to obtaining a pass notification from synchronization arbiter 230.

Once the addresses of the critical section have been acquired, a processor core 18 that has had its addresses passed by synchronization arbiter 230 may obtain each cache line for exclusive access (e.g. write permission) as memory reference instructions are processed in the atomic phase. After a passed cache line arrives, processor core 18 may hold onto that cache line and prevent other processor cores from stealing the line by responding to coherent invalidation probes with Fail-to-REQUESTOR responses. It is noted that Fail-to-REQUESTOR may also be referred to as a negative-acknowledgement (NAK).

As described above, when a processor receives a Fail-to-REQUESTOR and it is currently participating in an advanced synchronization instruction sequence, that instruction sequence will be caused to fail at the ACQUIRE instruction. In this case, the subsequent conditional jump is taken and the damage inducing part of the memory reference instructions in the critical section may be avoided. However, when a processor receives a Fail-to-REQUESTOR and is not participating in an advanced synchronization instruction sequence, the requesting processor's BIU may just re-request the original memory transaction. Thus, the elapsed time between the sending of the Fail-to-REQUESTOR and the subsequent arrival of the next coherent invalidation probe at the passed critical section enables forward progress of the processor with the synchronization arbiter's blessing to be guaranteed. The guarantee of forward progress enables the advanced synchronization facility to be more efficient under contention than currently existing synchronization mechanisms. Accordingly, sooner or later, both the critical section and the interfering memory reference may both be performed (e.g., no live-lock, nor dead-lock).

As mentioned above, the performance of a processor participating in the Advanced Synchronization Facility may be optimized by using a critical section predictor 223. Initially predictor 223 may be set up to predict that no interference is expected during execution of a critical section. In this mode, processor core 18 may not actually use the synchronization arbiter 230. Instead processor core 18 may record the LOCKed memory references and may check these against Coherent Invalidation PROBEs to detect interference. If the end of the critical section is reached before any interference is detected, no interested third party has seen the activity of the critical section and it has been performed as if it was executed atomically. This property enables the Advanced Synchronization Facility to be processor-cycle competitive with currently existing synchronization mechanisms when no contention is observed.

More particularly, when interference is detected, processor core 18 may create a failure status for the ACQUIRE instruction and the subsequent conditional branch redirects the flow of control out of the critical section, and resets the predictor to predict deterministic mode. When the next critical section is detected, the decoder will then predict interference might happen, and will process the critical section using the synchronization arbiter 230 (if enabled).

In one embodiment, the Advanced Synchronization facility may operate on misaligned data items as long as these items do not span cache lines that are not participating in the actual critical section. Software is free to have synchronization items span cache line boundaries as long as all cache lines so touched are recognized as part of the critical section entry. When a data item spans a cache line into another cache line that was not part of the synchronization communication, the processor neither detects the failure of atomicity nor signals the lack of atomicity.

Further, access to critical section data may be dependent upon the presence of that data in main memory. All of the lines necessary for the critical section are touched before ENTRY into the critical section, and any access rights issues or page-faulting issues may be detected when the LOCKed Load or LOCKed PREFETCHW instructions execute prior to entering the critical section. When any of the lead-in addresses take a fault, the subsequent ACQUIRE instruction is made to fail. After entry to the critical section, if any instruction causes an exception, the processor will causes a failure at the ACQUIRE instruction, and the subsequent conditional jump redirects control away from the critical section.

In one embodiment, if the decoder of processor core 18 must take an interrupt, it may arrange that the ACQUIRE instruction will fail with the zero bit set (e.g., RFLAGS.ZF), and take the interrupt at the ACQUIRE instruction.

It is noted that in embodiments in which synchronization arbiter 230 is connected within a North Bridge implementation within the HyperTransport™ fabric, synchronization arbiter 230 may be assigned a predetermined and/or reserved node ID that no other component may have. This assignment may be made at boot time by the BIOS, for example. In addition, in the above embodiments, the count value may be returned as a 64-bit value, although other values are contemplated.

Figure 3:
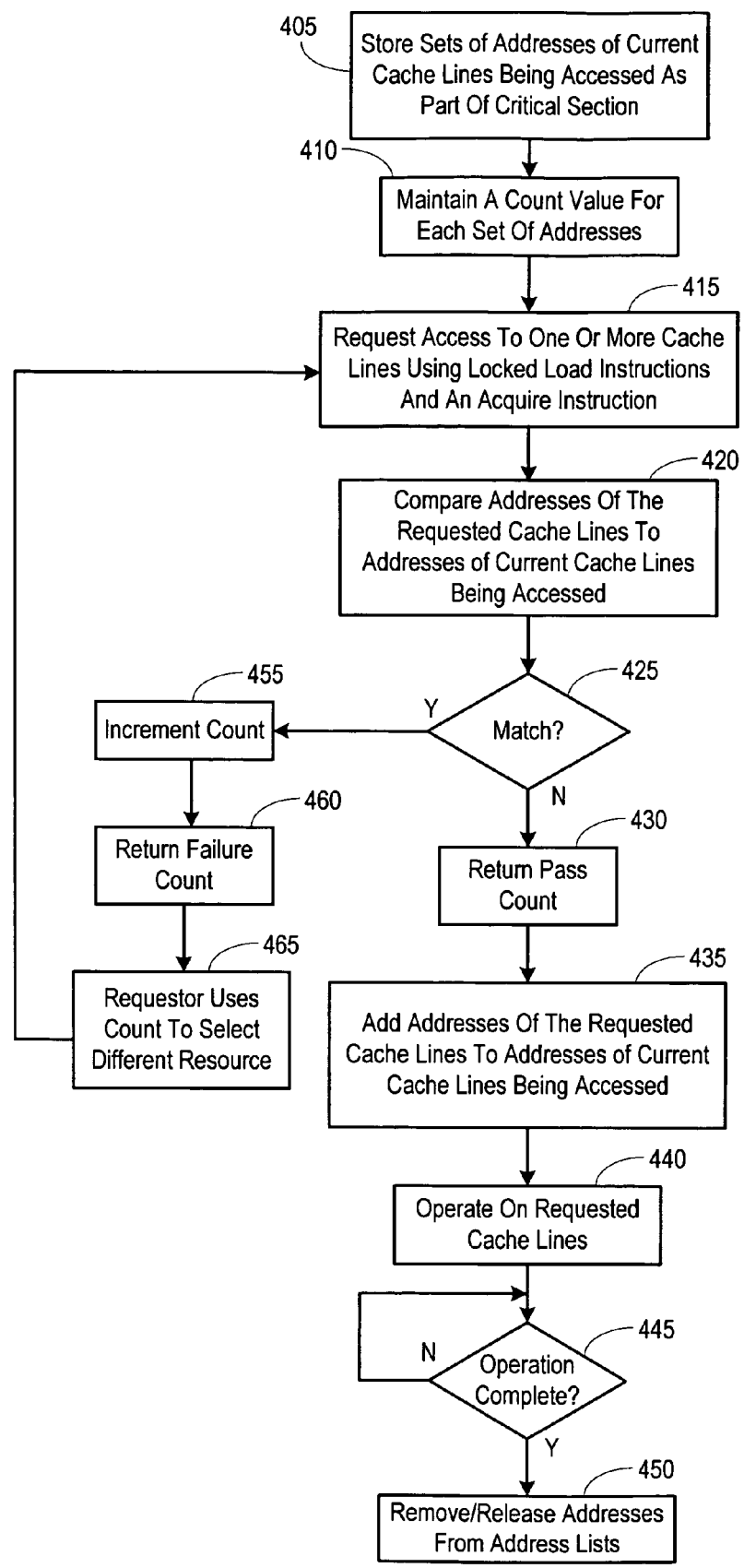
FIG. 3 is a flow diagram that describes operation of one embodiment of the computer system shown FIG. 1 and FIG. 2.

FIG. 3 is a flow diagram describing the operation of the embodiments of the computer system shown in FIG. 1 and FIG. 2. Referring collectively to FIG. 1 through FIG. 3, and beginning in block 405 addresses of cache lines that are currently being operated on or accessed as part of a critical section are maintained in a list (e.g., within LLB 222). For example, synchronization arbiter 230 may store the addresses corresponding to a critical section, as a set, within an entry of address storage 232. In one embodiment, each entry of address storage 232 may also store a count value that is associated with the whole set of addresses stored therein (block 410). As described above, the count value may be indicative of the number of contenders (i.e., interferers) for any of the addresses in the set. In another embodiment, synchronization arbiter 230 may store a number of count values within each entry, such that each address in the entry has a an associated count value.

When a processor or processor core that is implementing the advanced synchronization facility, requests exclusive access to one or more cache lines, the request comes in the form of a critical code section. For example, as described above, to ensure completion of the instructions in an atomic manner (as viewed by all outside observers) a critical section may include the use of LOCKed MOV instructions, followed by an ACQUIRE instruction and a RELEASE instruction (block 415). Accordingly, the set of addresses that are requested are checked for interference. In one embodiment, the set of addresses is compared to all of the addresses within address storage 232 (block 420). In the embodiments described above, the LOCKed MOV instructions cause the addresses to be marked. The marker causes BIU 220 to store each marked address in LLB 222. The ACQUIRE instruction causes BIU 220 to send the entire set of address in LLB 222 to synchronization arbiter 230 in the form of an unCacheable write that carries 64-bytes of physical address data. Synchronization arbiter 230 compares the set of addresses to all the addresses in the storage 232.

If there is a match on any address (block 425), the count value associated with the matching address is incremented (block 455) and the new count value is returned to BIU 220 as a part of a failure response to the unCacheable write (block 460) that carries 64-bits of response data. In addition, synchronization arbiter 230 discards the set of addresses upon failure. BIU 220 sends the failure count value to the register of the requesting processor/core, which may also set condition code flags. As a result, the requesting processor/core may use the count value to select another set of memory resources in subsequent operations (block 465) and avoid interference on its subsequent synchronization attempt. Operation proceeds as described above in block 415.

Referring back to block 425, if there is no matching address in storage 232, synchronization arbiter 230 may return a passing count value (e.g., zero) to BIU 220 (block 430). In addition, synchronization arbiter 230 may store the set of addresses in an entry of storage 232 (block 435). BIU 220 may send the passing count value to the requesting processor/core register specified in the ACQUIRE instruction. As such, the requesting processor/core may manipulate or otherwise operate on the data at the requested addresses (block 440). If the operation is not complete (block 445), BIU 220 defers sending a completion message to synchronization arbiter 230. When the operation in the critical section is complete such as when the RELEASE instruction is executed, BIU 220 may send a completion message to synchronization arbiter 230. Upon receiving the completion message, synchronization arbiter 230 may flush the corresponding addresses from storage 232, thereby releasing those addresses back to the system (block 450) for use by another processor/core. In addition, load/store unit 270 updates the data cache for all instructions in that critical section that retired.

Figure 4:
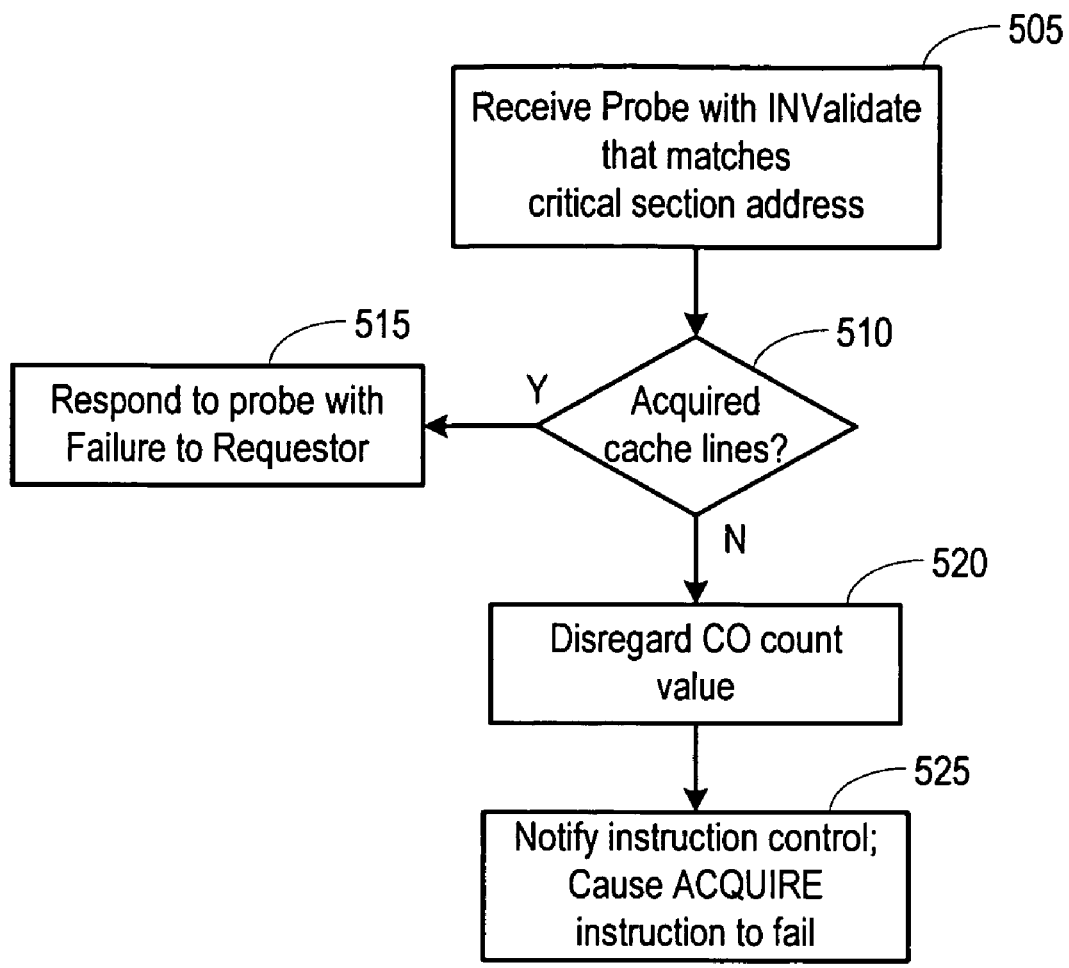
FIG. 4 is a flow diagram that describes operation of one embodiment of the computer system shown FIG. 1 and FIG. 2 in response to receiving a coherency invalidation probe.

As described above, if a coherency invalidation probe hits on an address in the critical section during processing of the critical section, the response to that probe may be dependent upon the state of processing of the critical section (i.e., whether or not the cache lines have been acquired). FIG. 4 is a flow diagram describing the operation of the embodiments of FIG. 1 and FIG. 2 when a coherency invalidation probe is received.

Referring collectively to FIG. 1 through FIG. 4 and beginning in block 505 of FIG. 4, a Probe is received and hits on a critical section address in load store unit 270. If the requested lines have been successfully acquired (block 510), (e.g., a coherency invalidation probe is received after synchronization arbiter 230 has provided a pass count value, and stored the set of addresses within storage 232), BIU 220 may send a Failure-to-Requestor response as a response to the probe (block 515). At the requesting processor core, this Failure-to-Requestor response should cause a failure of the ACQUIRE instruction if the processor core was operating in a critical section, or a retry of the addresses if not.

Referring back to block 510, if the requested lines have not been acquired, the processor core may ignore any count value received form synchronization arbiter 230 (block 520). Load/store unit 270 may notify instruction dispatch and control unit 257 that there is a probe hit (e.g., Prb hit signal), and thus there is a Failure-to-Acquire. As such, the ACQUIRE instruction is made to fail, as described above. As such, to an outside observer the ACQUIRE instruction simply failed.

It is noted that although the computer system 100 described above includes processing nodes that include one or more processor cores, it is contemplated that in other embodiments, the advanced synchronization facility and associated hardware may be implemented using stand-alone processors or a combination of processing nodes and stand-alone processors, as desired. In such embodiments, each stand-alone processor may include all or part of the above described hardware and may be capable of executing the instructions that are part of the advanced synchronization facility. As such the terms processor and processor core may be used somewhat synonymously, except when specifically enumerated to be different.

Code and/or data that implements the functionality described in the preceding sections may also be provided on computer accessible/readable medium. Generally speaking, a computer accessible/readable medium may include any media accessible by a computer during use to provide instructions and/or data to the computer. For example, a computer accessible medium may include storage media such as magnetic or optical media, e.g., disk (fixed or removable), CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc., as well as media accessible via transmission media or signals such as electrical, electromagnetic, or digital signals, conveyed via a communication medium such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
   a processor that implements an x86 architecture requesting exclusive access to a given memory resource, wherein the requesting includes executing a critical section of code having one or more memory reference instructions, wherein the one or more memory reference instructions comprise mov instructions, each having an x86 LOCK instruction prefix followed by an acquire instruction, wherein during a specification phase, each mov instruction having the x86 LOCK instruction prefix specifies a corresponding memory address associated with the given memory resource;

in response to execution of each mov instruction having the x86 LOCK prefix, storing the corresponding memory address within a processor buffer;

in response to execution of the acquire instruction:
sending each memory address stored within the processor buffer to be compared; and
comparing each memory address specified in the critical section of code to each address of a plurality of sets of addresses, wherein each address of the plurality of sets of addresses corresponds to a respective memory resource to which a requestor has been granted exclusive access; and in response to any memory address of the critical section of code matching any address of a plurality of sets of addresses, causing the acquire instruction to fail; and
inhibiting modifying data corresponding to any memory address specified by the one or more mov instructions having the x86 LOCK instruction prefix in the critical section of code.

2. The method as recited in claim 1, further comprising in response to no memory address of the critical section of code matching any address in the plurality of sets of addresses, generating a success indication that then enables data modification, modifying data corresponding to all memory addresses in the critical section of code, and releasing all memory addresses in the critical section of code for use by other processors upon completion of the modification.

3. The method as recited in claim 1, further comprising causing the acquire instruction to fail, and inhibiting modifying data corresponding to any memory address in the critical section of code in response to receiving a PROBE message corresponding to any memory address specified in the specification phase of the critical section of code prior to receiving an indication of whether any memory address of the critical section of code matches any address of the plurality of sets of addresses.

4. The method as recited in claim 1, further comprising responding to a received PROBE message corresponding to any memory address of the critical section of code with a failure message in response to receiving an indication that no memory address of the critical section of code matches any address in the plurality of sets of addresses.

5. The method as recited in claim 1, wherein the indication that no memory address of the critical section of code matches any address in the plurality of sets of addresses comprises a pass count value of zero.

6. The method as recited in claim 1, further comprising modifying a particular condition code register flag in response receiving an indication that a memory address of the critical section of code matches any address of the plurality of sets of addresses.

7. The method as recited in claim 6, wherein causing the acquire instruction to fail includes branching out of the critical section of code by executing a subsequent conditional jump instruction based upon the particular condition code register flag value.

8. The method as recited in claim 6, wherein in response to accepting an enabled interrupt, causing the acquire instruction to fail by modifying a particular condition code register flag and branching out of the critical section of code by executing a subsequent conditional jump instruction based upon the particular condition code register flag value.

9. The method as recited in claim 1 wherein causing the acquire instruction to fail includes notifying a retire circuit within the processor that the acquire instruction has failed.

10. The method as recited in claim 1, further comprising in response to any memory address of the critical section of code matching any address in the plurality of sets of addresses, returning a count value associated with the matching address, wherein the count value is indicative of a number of requestors contending for the matching address.

11. A computer system comprising:
a plurality of processors that implement an x86 architecture, and coupled together and to one or more memories, wherein each of the processors is configured to execute instructions to request exclusive access to a given memory resource, wherein the request includes a specification phase of a critical section of code having one or more memory reference instructions, wherein the one or more memory reference instructions comprise mov instructions, each having an x86 LOCK instruction prefix, followed by an acquire instruction, wherein each mov instruction having the x86 LOCK instruction prefix specifies a corresponding memory address associated with the given memory resource; and wherein in response to execution of each mov instruction having the x86 LOCK prefix, the processor is configured to store the corresponding memory address within a buffer of the requesting processor;

wherein in response to execution of the acquire instruction the processor is configured to send each memory address stored within the buffer to be compared;

an arbitration unit coupled to the plurality of processors and configured to compare each memory address of the specification phase the critical section of code to each address of a plurality of sets of addresses in response to execution of the acquire instruction, wherein each address of the plurality of sets of addresses corresponds to a respective memory resource to which a requestor has been granted exclusive access;

wherein in response to any memory address of the critical section of code matching any address of a plurality of sets of addresses, each of the processors is configured to:
cause the acquire instruction to fail; and
inhibit modifying data corresponding to any memory address specified by the one or more mov instructions having the x86 LOCK instruction prefix in the critical section of code.

12. The computer system as recited in claim 11, wherein in response to no memory address of the critical section of code matching any address in the plurality of sets of addresses, a given processor of the plurality of processors is configured to: generate a success indication that then enables data modification, modify data corresponding to all memory addresses in the critical section of code, and release all memory addresses in the critical section of code for use by other processors upon completion of the modification.

13. The computer system as recited in claim 11, wherein each of the processors is configured to cause the acquire instruction to fail, and to inhibit modifying data corresponding to any memory address in the critical section of code in response to receiving a PROBE message corresponding to any memory address of the critical section of code prior to receiving an indication of whether any memory address of the critical section of code matches any address of the plurality of sets of addresses.

14. The computer system as recited in claim 11, wherein a given processor of the plurality of processors is configured to respond to a received PROBE message corresponding to any memory address of the critical section of code with a failure message in response to receiving an indication that no memory address of the critical section of code matches any address in the plurality of sets of addresses.

15. The computer system as recited in claim 11, wherein the indication that no memory address of the critical section of code matches any address in the plurality of sets of addresses comprises a pass count value of zero.

16. The computer system as recited in claim 11, wherein each of the processors is configured to modify a particular condition code register flag in response receiving an indication that a memory address of the critical section of code matches any address of the plurality of sets of addresses.

17. The computer system as recited in claim 16, wherein each of the processors is configured to branch out of the critical section of code by executing a conditional jump instruction subsequent to the acquire instruction based upon the particular condition code register flag value.

18. The computer system as recited in claim 16, wherein in response to accepting an enabled interrupt, each processor is configured to cause the acquire instruction to fail by modifying a particular condition code register flag and branching out of the critical section of code by executing a subsequent conditional jump instruction based upon the particular condition code register flag value.

19. The computer system as recited in claim 11, wherein each of the processors is configured to cause the acquire instruction to fail by notifying a respective retire circuit within each processor that the acquire instruction has failed.

20. The computer system as recited in claim 11, wherein the arbitration unit is configured to return a count value associated with the matching address in response to any memory address of the critical section of code matching any address in the plurality of sets of addresses, wherein the count value is indicative of a number of requestors contending for the matching address.

* * * * *